United States Patent [19]
Smithline

[11] Patent Number: 5,734,336
[45] Date of Patent: Mar. 31, 1998

[54] COLLISION AVOIDANCE SYSTEM

[75] Inventor: Stuart B. Smithline, Roswell, Ga.

[73] Assignee: Collision Avoidance Systems, Inc., Roswell, Ga.

[21] Appl. No.: 432,093

[22] Filed: May 1, 1995

[51] Int. Cl.$^6$ ........................................ G08G 1/16
[52] U.S. Cl. ............... 340/903; 340/901; 340/435; 340/436; 340/438; 250/235; 250/236; 180/168; 180/169; 180/271
[58] Field of Search .................. 340/901–905, 340/435, 436, 438; 250/235, 236, 224; 180/167, 168, 169, 271

[56] References Cited

U.S. PATENT DOCUMENTS

| | | | |
|---|---|---|---|
| D. 340,903 | 11/1993 | Wayne | D12/188 |
| 4,694,295 | 9/1987 | Miller et al. | 340/903 |
| 4,803,488 | 2/1989 | Dombrowski | 340/904 |
| 4,943,796 | 7/1990 | Lee | 340/435 |
| 5,122,796 | 6/1992 | Beggs et al. | 180/169 |
| 5,235,316 | 8/1993 | Qualizza | 340/436 |
| 5,303,205 | 4/1994 | Gauthier et al. | 367/108 |
| 5,373,482 | 12/1994 | Gauthier | 367/99 |
| 5,463,384 | 10/1995 | Judds | 340/435 |
| 5,515,341 | 5/1996 | Toda et al. | 340/435 |
| 5,521,579 | 5/1996 | Bernhard | 180/169 |
| 5,528,217 | 6/1996 | Adams | 340/435 |
| 5,581,464 | 12/1996 | Woll et al. | 364/424.04 |
| 5,594,413 | 1/1997 | Cho et al. | 340/435 |
| 5,594,414 | 1/1997 | Namngani | 340/436 |
| 5,598,164 | 1/1997 | Reppas et al. | 342/70 |
| 5,604,590 | 2/1997 | Uehara | 356/28 |

*Primary Examiner*—Jeffery Hofsass
*Assistant Examiner*—Ashok Mannava
*Attorney, Agent, or Firm*—Needle & Rosenberg

[57] ABSTRACT

A system for preventing collisions between a vehicle and other objects, the vehicle having a blind side, an opposite driver side, a from end and an opposite rear end, has side ranging capability that determines the distance from the blind side of the vehicle to an object in a lane immediately adjacent to the blind side while the vehicle is in the process of moving into a traffic lane immediately adjacent to the blind side. Rear ranging capabilities are employed to determine the distance from the rear side to an object behind the vehicle while the vehicle is in the process of backing up. A calculating capability, responsive to the side ranging capability and the rear ranging capability, determines when an object is in a lane immediately adjacent to the blind side while the vehicle is in the process of moving into the lane immediately adjacent to the blind side and also determines when an object is behind the vehicle while the vehicle is in the process of backing up. An indicating capability, responsive to the calculating means, indicates that an object is in the lane immediately adjacent to the blind side while the while the vehicle is in the process of moving into the lane immediately adjacent to the blind side and indicates that an object is behind the vehicle while the vehicle is in the process of backing up.

10 Claims, 6 Drawing Sheets

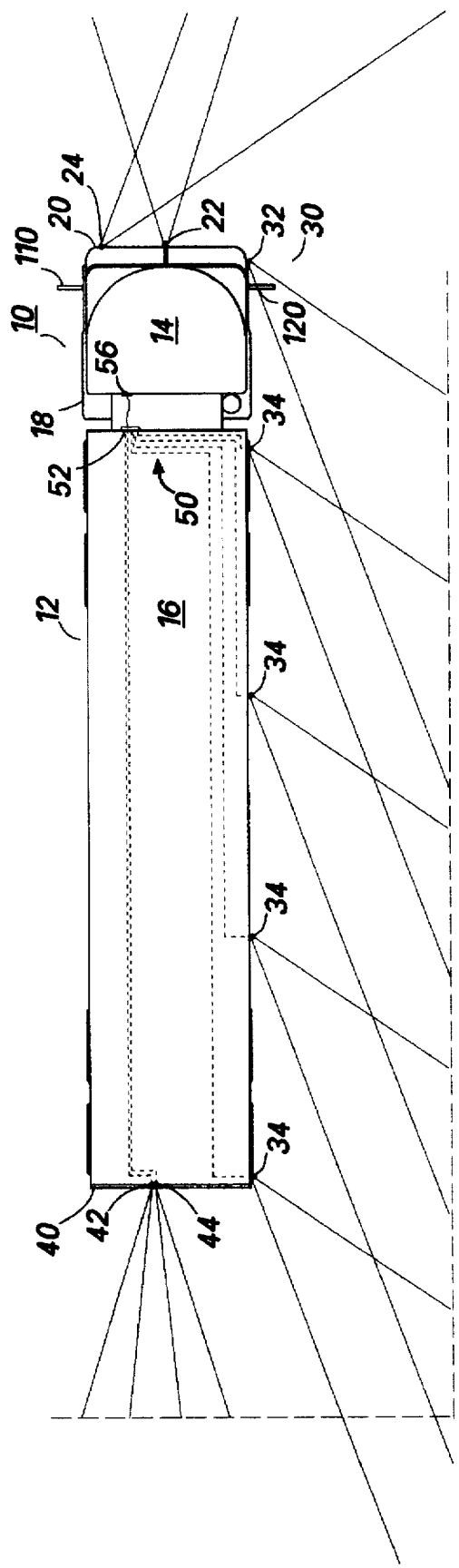
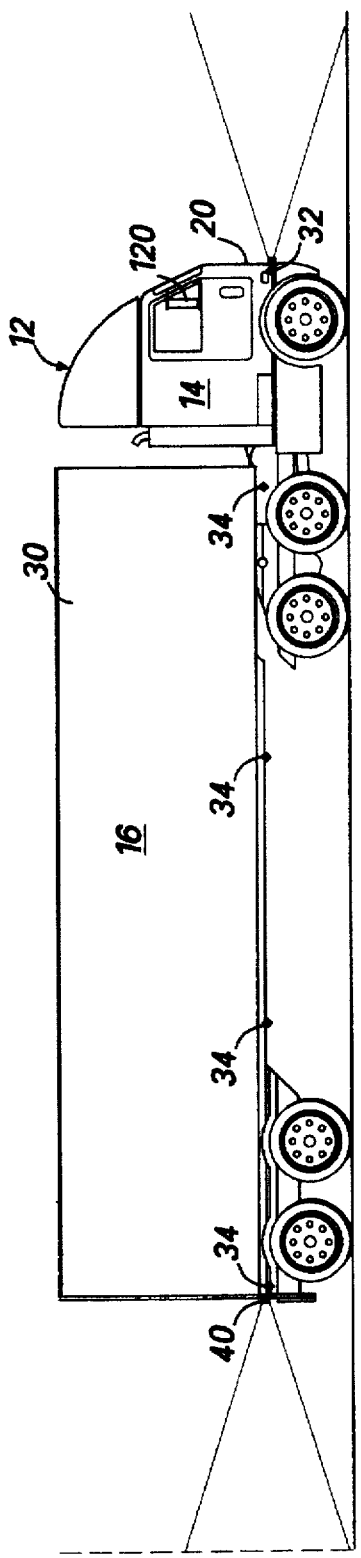
FIG.1A
FIG.1B

COLLISION AVOIDANCE SYSTEM

BACKGROUND OF THE INVENTION

1. Field of the Invention

The present invention relates to safety systems and, more specifically, to a system for alerting vehicle operators of the potential for collisions.

2. Description of the Prior Art

Millions of dollars are lost each year in the trucking industry due to avoidable accidents. Included in the common types of accidents are backing-related collisions, in which a truck backing into a loading dock collides with the dock, thereby causing damage to both the track and the dock. Also common are merging collisions, in which a truck merges into a lane and collides with another vehicle in the merged lane, and front end collisions, in which a truck collides with an object in front of it. In many cases the drivers inability to see certain critical areas around the truck contribute to these collisions.

Several devices attempt to aid drivers in preventing collisions. These include U.S. Pat. No. 4,694,295, issued to Miller, et al., which discloses a vehicle blind spot detector comprising a sequentially operating dual sensor technology. An infrared light emitting diode is coupled to an infrared sensitive phototransistor or photo-darlington through the reflectance of incident light energy from a target vehicle. Once the target vehicle is detected, a second sensor is activated after a preset delay. The second sensor is ultrasonic. The vehicle operator is given the distance between his vehicle and the target vehicle. U.S. Pat. No. 4,803,488, issued to Dombrowski, discloses a driver alerting device including a transceiver adapted for mounting at the rearward end era vehicle. Wave signals for objects within the transceiver range are picked up and supplied to the transceiver by an antenna. Any resultant Doppler shift signal is amplified for driving an audio alarm adapted for placement within the passenger compartment of the vehicle. The circuit is adapted for electrical connection to the back-up light circuit of the vehicle for activation only when the vehicle transmission is engaged in reverse gear.

U.S. Pat. No. 4,943,796, issued to Lee, discloses a rear view mirror mounted reversing distance sensor for automobiles having a housing, a cover, a spring and a retaining bracket.

None of the above-described references disclose a system for indicating to a driver the existence of potential hazards of several different types relative to several locations around the vehicle, nor do any of the above-described references display information regarding potential hazards in an intuitively easily understandable manner in locations that truck drivers otherwise look at regularly. Also, none of the above-described inventions use intelligent algorithms to limit the range of their ranging devices to areas in which a heard will likely exist.

SUMMARY OF THE INVENTION

The present invention, known as the Collision Avoidance System (CAS), overcomes the disadvantages of the prior art by using a plurality of acoustic piezoelectric transducers to determine the location of objects near the vehicle, a microprocessor to process information from the transducers and several displays to efficiently display heard information to the vehicle's operator.

The present invention uses a plurality of side ranging sensors, such as a piezoelectric acoustic transducer operating in the ultrasonic frequency range, disposed along the blind side of the vehicle (the side of the vehicle opposite the driver side), for determining the distance from the blind side to an object in an area immediately adjacent to the blind side while the vehicle is in the process of moving into the area immediately adjacent to the blind side. Although piezoelectric transducers are employed in the preferred embodiment, other suitable sensors (including optical and non piezoelectric acoustic) may be employed. Rear ranging sensors, also piezoelectric transducers, are employed to determine the distance from the rear side to an object behind the vehicle while the vehicle is in the process of backing up. A microprocessor, or other calculating means, responsive to the side ranging sensors and the rear ranging sensors, determines when an object is immediately adjacent to the blind side of the vehicle and also determines when an object is behind the vehicle. An indicator, responsive to the microprocessor, indicates to the operator the presence of an object.

The system also has a sensor disposed on one of the front wheels for determining the angular displacement of a front wheel of the vehicle and an input from the vehicle's speedometer for determining the speed of the vehicle. Using inputs from the wheel sensor and the speedometer, the system determines when the vehicle is merging into the immediately adjacent lane. It also determines the degree to which the vehicle has merged into an immediately adjacent lane based on the angular displacement of the front wheel and a predetermined estimation of the width of the immediately adjacent lane, thereby determining the distance from the blind side of the vehicle to the far side of an immediately adjacent lane. This information is used to limit the range of the side ranging sensors to the distance from the blind side of the vehicle to the far side of the immediately adjacent lane.

The system also has sensors for determining the location of an object relative to the length of the blind side of the vehicle and a display for displaying the location of the object relative to the blind side of the vehicle. The blind side display employs a plate having a top plan image of the vehicle and a plurality of light emitting diodes spaced apart along a side of the image corresponding to the blind side of the vehicle. The microprocessor, along with display dryers, act as a means for illuminating a selected one of the light emitting diodes corresponding to the location of the object relative to the vehicle.

Typically, trucks and other large vehicles have an external mirror mounted on the blind side and the blind side display also comprises a plurality of spaced apart light emitting diodes disposed adjacent the mirror. The number of the light emitting diodes illuminated indicates the distance from the vehicle to an object immediately adjacent to the blind side of the vehicle.

The vehicle typically also has an external mirror mounted on the driver side and the backing up hazard display employs a plurality of spaced apart light emitting diodes, disposed adjacent the minor with the number of light emitting diodes illuminated indicating the distance from the vehicle to an object behind the vehicle. The driver side mirror also has an alpha-numeric multi-segment display that displays the distance from the rear side of the vehicle to an object behind the vehicle. This feature aids the operator when backing the vehicle to loading docks, thereby allowing precise backing.

The system also periodically records the speed of the vehicle and the distance from the vehicle to an object, as well as other important parameters like braking and a time/date stamp, thereby preserving data for use in accident reconstruction. To do this, the microprocessor records the necessary information onto a nonvolatile digital memory. The system may also be equipped with a battery backup to preserve system reliability.

The microprocessor may also be programmed to continuously perform a diagnostic test of a set of system components to ensure correct operation of the system. If a malfunction is detected, the system notifies the operator through an alarm and a digital readout on a display.

The rear ranging sensor may also comprise a piezoelectric transducer, or other similar sensor, disposed on the rear side of the vehicle, which produces an acoustic signal directed toward the object and which receives an acoustic signal reflected back toward the transducer from the object.

To prevent head-on collisions, the system may also have a front ranging sensor for acoustically determining the distance from the front side of the vehicle to the object. The system determines the speed of the vehicle, again from an input from the speedometer. The microprocessor determines when the object is within a preselected range from the front side of the vehicle, the preselected range selected based on the speed of the vehicle, and indicates, through an audible alarm, a visual indicator and a digital readout to the operator of the vehicle when an object is within the preselected range. Also disposed on the front end of the vehicle may be a sensor for acoustically detecting the presence of an object within an area comprising a blind spot in front of the vehicle.

The preselected ranges can be divided between, for example, a city mode, in which the vehicle normally travels at a low speed, and a highway mode, in which the vehicle travels at high speed. At lower speeds, the range is less than when the vehicle is travelling at higher speeds, as the distance required to stop the vehicle is less. The range can be indicated to the microprocessor with a manual switch. In another preferred embodiment, the preselected range is determined automatically. The microprocessor accesses a look-up table having a list of speeds and corresponding preselected ranges and selects the range corresponding to the current speed of the vehicle.

It is an object of the present invention to detect driving hazards in the areas they are most likely to exist.

It is also an object of the present invention to display information regarding driving hazards in a manner easily perceived and understood by a driver.

These and other objects will become apparent from the following description of the preferred embodiments taken in conjunction with the following drawings, although variations and modifications may be effected without departing from the spirit and scope of the novel concepts of the disclosure.

BRIEF DESCRIPTION OF THE FIGURES OF THE DRAWINGS

FIG. 1A is a top plan view of the present invention disposed on a semi-trailer truck.

FIG. 1B is a side elevational view of the present invention disposed on a semi-trailer truck.

DETAILED DESCRIPTION OF THE PREFERRED EMBODIMENTS

Figure 2:
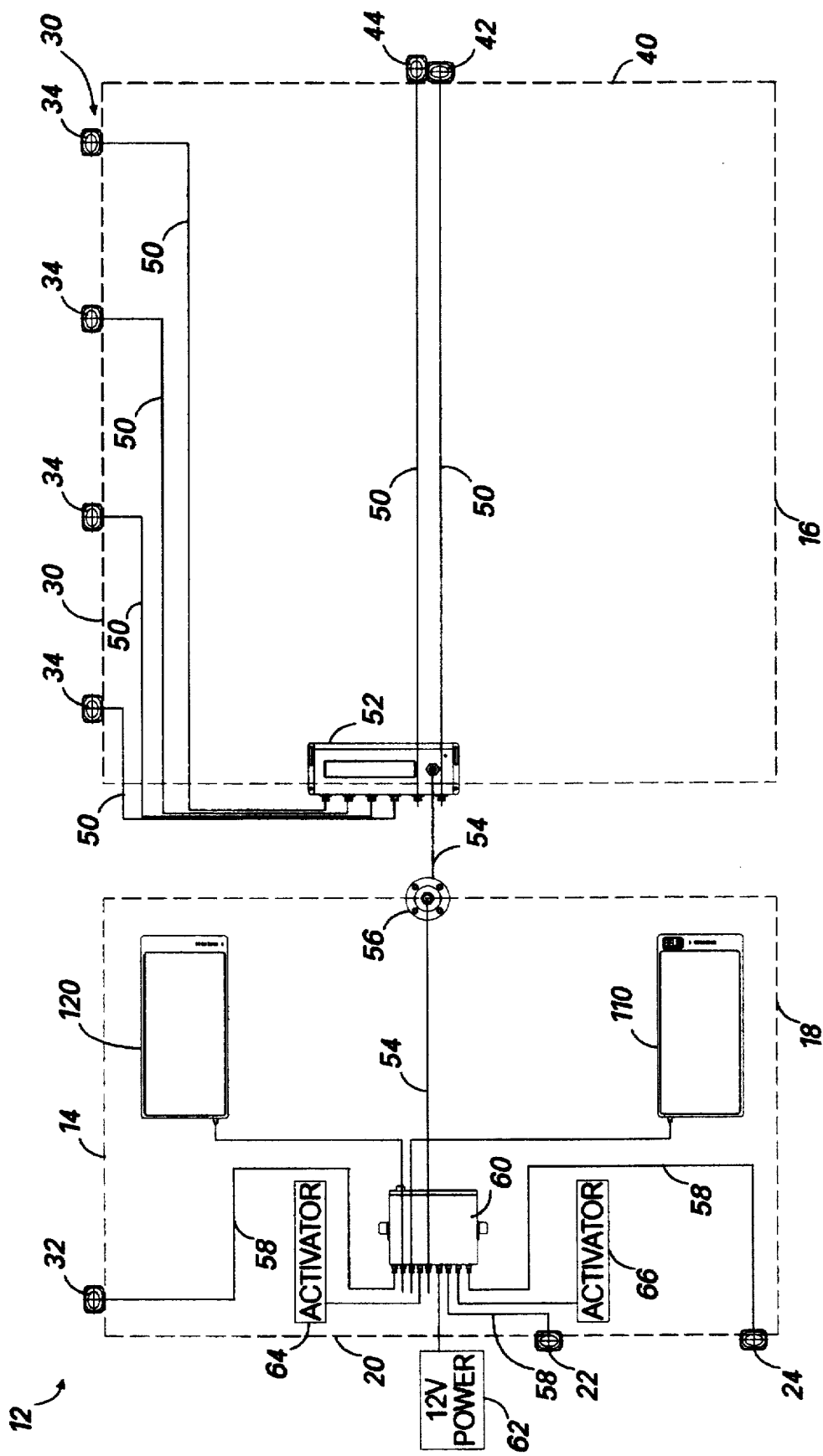
FIG. 2 is a schematic diagram of the present invention.

A preferred embodiment of the invention is now described in detail. Referring to the drawings, like numbers indicate like parts throughout the views.

As shown in FIGS. 1A & 1B, the present invention 10 comprises a collision avoidance system disposed on a vehicle 12 such as a truck having a cab 14 and a trailer 16. The vehicle 12 will typically have a driver side 18, a front end 20, a blind side 30 and a rear end 40.

Disposed on the front end 20 is a piezoelectric acoustic transducer 22 directed in front of the vehicle 12 for detecting the range of objects (not shown) in front of the vehicle 12. An example of a suitable transducer is the 9000 Series Piezo Transducer available from Polaroid Corporation. This transducer performs the functions of sending an ultrasonic acoustic signal and receiving the signal reflected off of an object. Also disposed on the front end 20 is another transducer 24 directed at an angle from one of the front corners of the cab 14 for detecting the presence of objects (not shown) in the blind spot of the vehicle 12, such as in the area immediately in front of the cab 14.

Along the blind side 30 are a plurality of transducers 34 disposed on the trailer 16 and a transducer 32 disposed on the cab. These transducers 32, 34 are used to determine the presence and location of objects (not shown) near the blind side 30 of the vehicle 12.

Disposed on the rear end 40 is a general hazard transducer 42 for detecting the presence of objects (not shown) behind the vehicle 12 and a close range transducer 44 for determining the range to objects (such as a loading dock) behind the vehicle 12. Initially these transducers act independently as the vehicle 12 is backing into a loading dock. Once the vehicle 12 gets within a preselected range, such as fifteen inches in one embodiment, the transducers switch into a mode in which transducer 44 acts as a sending transducer and transducer 42 acts as a receiving transducer, this allows the distance to the object to be determined with a degree of precision of one-fourth inch to one-eighth inch.

Referring to FIG. 2, the transducers 34, 42 & 44 on the trailer 16 are connected to a junction box 52 with electrical wires 50 of the type common to the art. A connector cable 54 connects the wires from the junction box 52 to a main control box 60. The connector cable 54 passes into the cab 14 through a cab plug 56, which holds the cable 54 in place and seals the hole through which the cable 54 passes. The cab-mounted transducers 22, 24 & 32 are connected to the main control unit 60 with wires 58. In an alternative, wireless, embodiment the transducers 34, 42 & 44 transmit their information to the main control unit 60 with a radio frequency transceiver. Heaters (not shown) may be provided near the transducers for operation in cold conditions.

The main control unit 60 receives its power from the vehicle's standard power system 62. The main control unit 60 also receives speed input from the speedometer 64 and an input 66 from the vehicle's turn signal. The main control unit 60 houses all of the control electronics and produces the signals to the displays, such as the displays mounted on the vehicle's mirrors 110, 120.

Figure 3A:
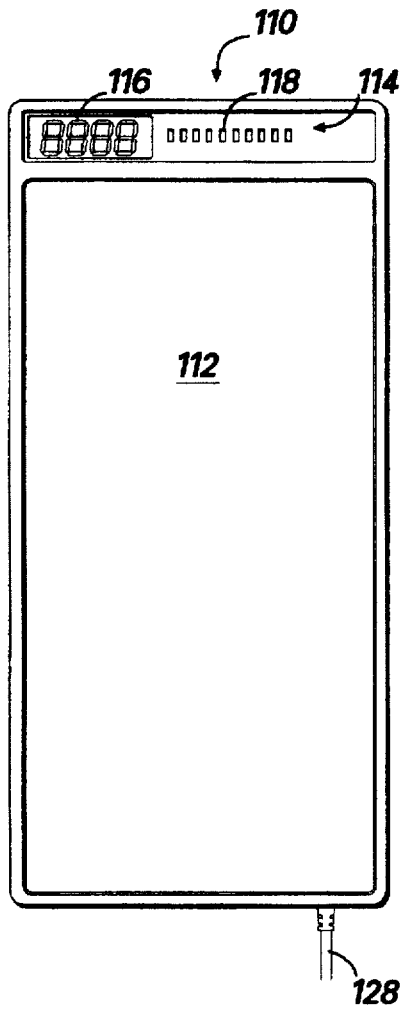
FIG. 3A is an elevational view of a distance display mounted on a dryer side mirror.

Referring to FIG. 3A, the driver side mirror 110 has a mirror portion 112 and a display portion 114. The display portion comprises an alpha-numeric display 116 (such as a seven-segment display) used to indicate to the operator the distance from the rear end of the vehicle to the object. A plurality of spaced apart light emitting diodes (LEDs) 118 provide a graphic indication of the distance to the object. The LEDs 118 can indicate distance by the number of illuminated LEDs, by the color of the LEDs lighted or by a combination of the two. The display portion 114 can be disposed adjacent the mirror portion 112, or part of the mirror portion can be left unsilvered and the display portion 114 can be disposed behind the unsilvered glass. The second way of disposing the display portion 114 may be less expensive to manufacture.

Figure 3B:
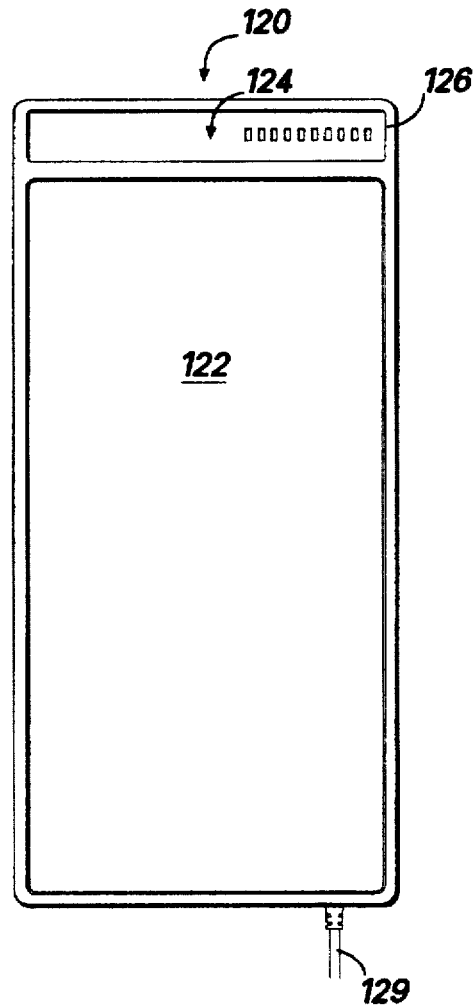
FIG. 3B is a an elevational view of a distance display mounted on a blind side mirror.

Referring to FIG. 3B, the blind side mirror 120, also has a mirror portion 122 and a display portion 124, which is associated with the mirror portion 122 as discussed above with respect to the driver side mirror 110. The display portion 124 on the blind side mirror 120 comprises a plurality of spaced apart LEDs 126 which indicate the distance to the nearest object to the blind side of the vehicle.

The mirrors of FIGS. 3A & 3B both receive input via a respective electrical cable 128, 129 from the main control box 60. Both mirrors 110, 120 are mounted to the exterior of the vehicle using conventional means.

Figure 4:
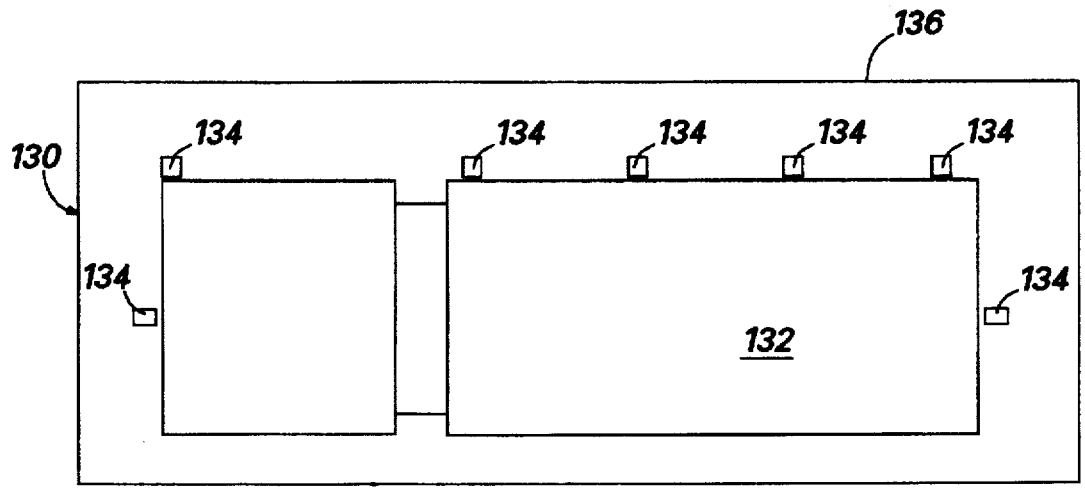
FIG. 4 is a schematic diagram of a location display.

As shown in FIG. 4, a display 130 may be employed to show the location of an object with respect to the vehicle. This display 150 comprises a plan image 132 of the vehicle printed, or otherwise placed, on a plate 136. A plurality of LEDs 134 are disposed on the plate 136 in positions relative to the image 132 corresponding to the transducers 34 (shown in FIG. 1) disposed around the vehicle 12. The illumination of one of the LEDs 134 indicates the presence of an object in the range of the transducer corresponding to one or more of the LEDs 134.

Figure 5:
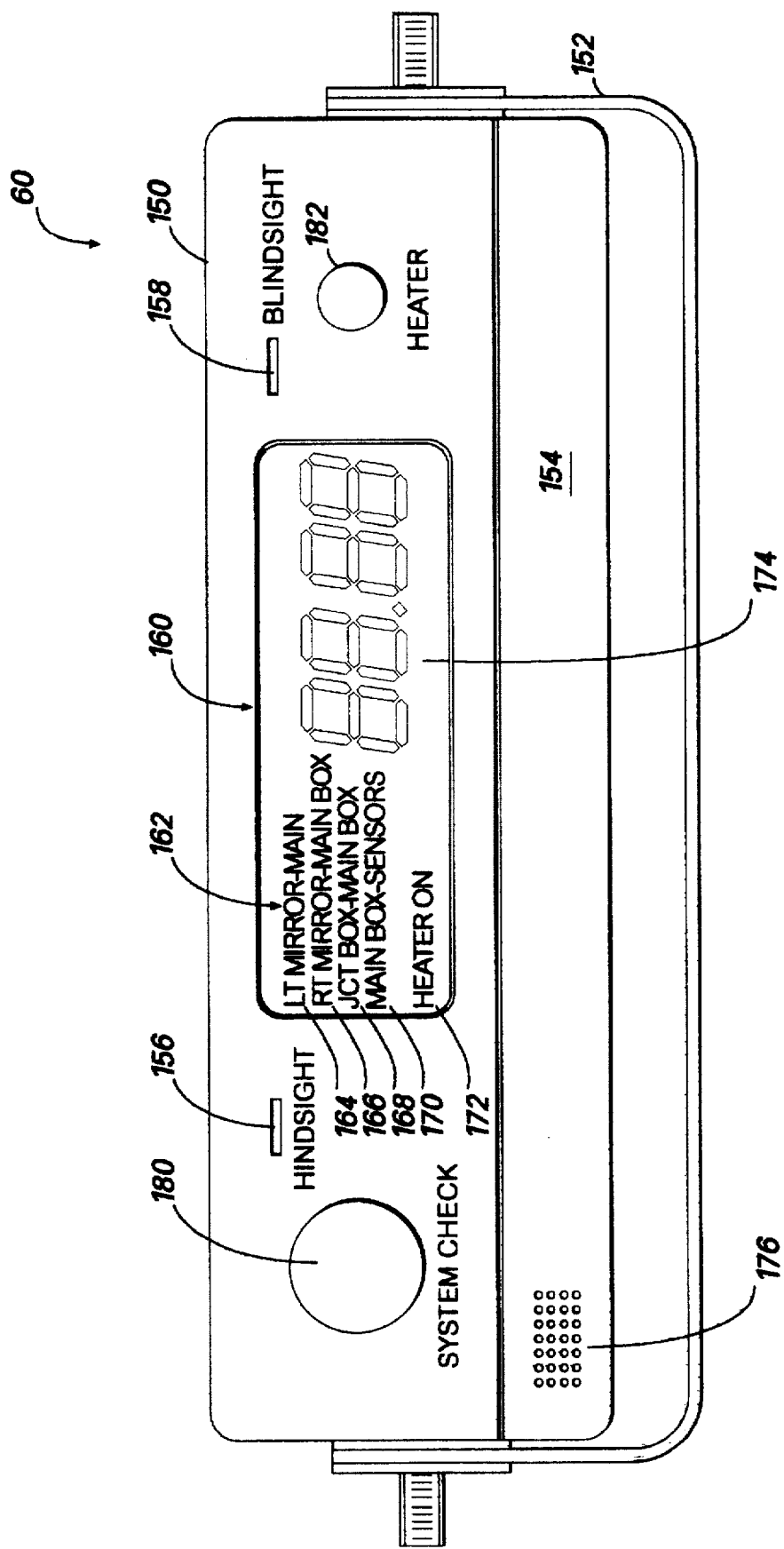
FIG. 5 is a front elevational view of the main control box.

As shown in FIG. 5, the main control box 60 comprises a housing 150 that is attachable to the vehicle with an external mounting bracket 152. The housing has a front panel 154 upon which is disposed a rear hazard LED 156, indicating that the rear end transducers are active, and a blind side hazard LED 158, indicating that the blind side transducers are active. Also disposed on the front panel 154 is a general information display 160 comprising a plurality of status indicators 162 and an alpha-numeric seven-segment display 174, which provides situation-specific information (e.g., distance to an object behind the vehicle while the vehicle is backing up). The status indicators 162 indicate the operability of various system components and include a left mirror component indicator 164, a fight mirror component indicator 166, a junction box component indicator 168, a main box component indicator 170 and a heater on/off indicator 172. The front panel 154 also has a plurality of holes 176 through which sound from an audible alarm passes. A display 190 of the type discussed in reference to FIG. 4 may also be disposed on the front panel 154.

The front panel 154 also has a system check/mode button 180 which serves two purposes. The first purpose is to provide a means for performing a manual system check during system startup. If the operator of the vehicle fails to perform a startup system check an audible alarm that increases in loudness is sounded, thereby ensuring that the operator performs a system check every time the vehicle is started. The second purpose of the system check/mode button 180 is to allow the operator to select between a "highway mode" and a "city mode," the highway mode indicating that the vehicle is travelling at a faster speed than when in the city mode, thereby selecting a longer front collision warning range. The front panel 154 also has a heater on/off button 182 for turning on component heaters during cold weather operation.

Figure 6A:
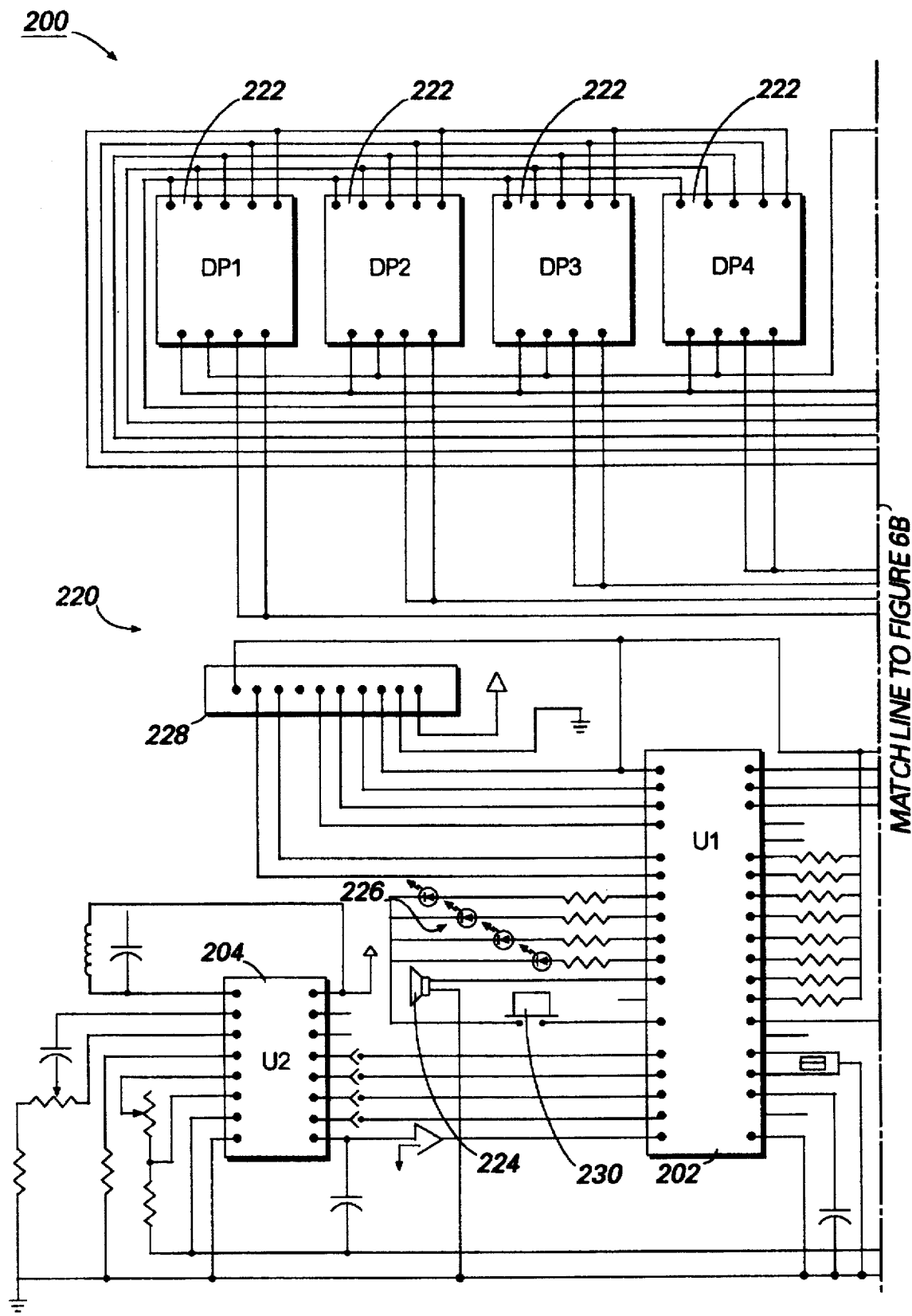
FIG. 6 is a schematic diagram representative of the electronics in the main control box.
Figure 6B:
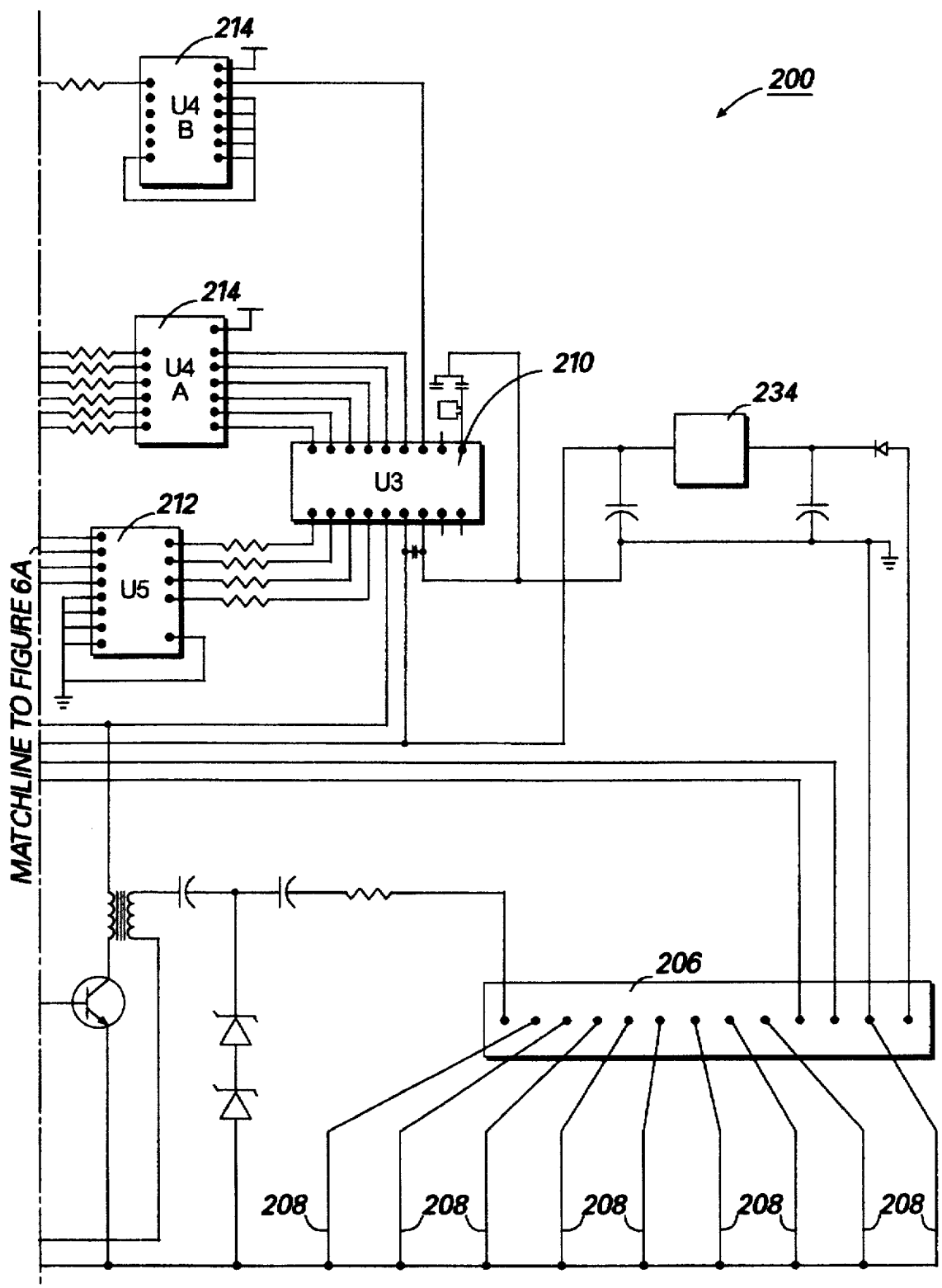

FIG. 6 shows the electronic components 200 in the main control box 60. At the heart of the electronics components 200 is a primary microprocessor 202 (such as a Zilog Z86C21 or one of many other commonly available microprocessors). A secondary microprocessor 204 (such as a Zilog Z86C08) is provided to drive the system's display components. The primary microprocessor 202 receives sensor input from the junction box 206 via a plurality of wires 208, one from each of the transducers, and the system check/mode button 230. The primary microprocessor outputs signals to the audible alarm 224, to the status indicator LEDs 226, to a junction 228 for transferring information to the mirrors, and to the main box display circuitry 220. Power to the electronic components 200 is controlled by a 5 V regulator circuit 234 of a type obvious to one skilled in the art of circuit design.

The main box display circuitry 220 comprises a plurality of seven-segment display elements 222 (such as HP 5501 elements) driven by an NPN transistor array 214 (such as a Harris CA3083 array) to provide appropriate signal levels to the display elements 222. An automatic gain control 212 (such as a Polaroid PID614906) ensures proper signal levels to the display and a buffer 210 (such as a Harris ACT 374) interfaces the display elements 222 to the primary microprocessor 202.

The program used in a preferred embodiment to run the microprocessor is disclosed in the Appendix to the specification. As would be obvious to one skilled in the art of computer system design, the disclosed computer program could be changed without departing from the scope of this invention.

In alternative embodiments, this system can be modified to include an accelerator cut-off for use, for example, in school busses. The cut-off would prevent the vehicle from moving if an object (e.g., a person) were to be detected in front of or behind the vehicle. This system could also be modified to be employed in airplanes to assist in precisely parking the plane in a designated gate, as well as to assist the automatic movement of the on ramp.

The above embodiments are given as illustrative examples and are not intended to impose any limitations on the invention. It will be readily appreciated that many deviations may be made from the specific embodiments disclosed in this specification without departing from the invention. Accordingly it is intended to cover all such modifications as within the scope of this invention.

What is claimed is:

1. A system for preventing collisions between a vehicle and other objects, the vehicle having a blind side, an opposite driver side, a front end and an opposite rear end, the system comprising:

a. side ranging means, disposed along the blind side of the vehicle, for determining the distance from the blind side to an object in a lane immediately adjacent to the blind side while the vehicle is in the process of moving into a traffic lane immediately adjacent to the blind side;

b. rear ranging means, disposed along the rear side of the vehicle, for determining the distance from the rear side to an object behind the vehicle while the vehicle is in the process of backing up, said rear ranging means comprising a general hazard transducer and a close range transducer, the general hazard transducer for detecting an object that is greater than a preselected distance behind the vehicle and the close range transducer for determining a distance to an object that is less than the preselected distance, the close range transducer having a precision between one-fourth inch to one-eight inch;

c. calculating means, responsive to said side ranging means and said rear ranging means, for determining when an object is in a lane immediately adjacent to the blind side while the vehicle is in the process of moving into the lane immediately adjacent to the blind side and for determining when an object is behind the vehicle and a distance to the object while the vehicle is in the process of backing up; and d. indicating means, responsive to said calculating means, for indicating that an object is in the lane immediately adjacent to the blind side while the while the vehicle is in the process of moving into the lane immediately adjacent to the blind side and for indicating that an object is behind the vehicle while the vehicle is in the process of backing up.

2. The system of claim 1 further comprising:

a. means for determining the location of an object relative to the blind side of the vehicle; and b. means, responsive to said determining means, for displaying the location of the object relative to the blind side of the vehicle.

3. The system of claim 2 wherein said displaying means comprises:

a. a plate having a top plan image of the vehicle;

b. a plurality of light emitting diodes spaced apart along a side of said image corresponding to the blind side of the vehicle; and c. means for illuminating a selected one of said light emitting diodes corresponding to the location of the object relative to the vehicle.

4. The system of claim 1 wherein the vehicle has an external mirror mounted on the blind side and the indicator means comprises a plurality of spaced apart light emitting diodes, disposed adjacent the mirror, the number of said light emitting diodes illuminated indicating the distance from the vehicle to an object immediately adjacent to the vehicle.

5. The system of claim 1 wherein the vehicle has an external mirror mounted on the driver side and the indicator means comprises:

a. a plurality of spaced apart light emitting diodes, disposed adjacent the mirror, the number of said light emitting diodes illuminated indicating the distance from the vehicle to an object behind the vehicle; and b. an alpha-numeric multi-segment display, disposed adjacent the minor, that displays the distance from the rear side of the vehicle to an object behind the vehicle.

6. The system of claim 1 further comprising means, responsive to said calculating means, for periodically recording the speed of the vehicle and the distance from the vehicle to an object, thereby preserving data for use in accident reconstuction.

7. The system of claim 6 wherein said calculating means comprises a digital microprocessor and said recording means comprises a nonvolatile digital memory.

8. The system of claim 1 wherein said calculating means further comprises means for periodically performing a diagnostic test of a set of system components to ensure correct operation of the system, and for notifying an operator of a malfunction of a system component.

9. The system of claim 1 wherein said general heard transducer and said close range transducer comprise piezoelectric transducers, disposed on the rear side of the vehicle, each producing an acoustic signal directed toward the object and each receiving an acoustic signal reflected back toward said transducer from the object.

10. The system of claim 1 wherein said side ranging means comprises:

a. a plurality of spaced-apart piezoelectric transducers, disposed along the blind side of the vehicle, each of which produces an acoustic signal directed toward the object; and b. a plurality of means, each disposed adjacent one of said transducers, for receiving a signal reflected back toward said transducer from the object.

* * * * *

UNITED STATES PATENT AND TRADEMARK OFFICE
CERTIFICATE OF CORRECTION

PATENT NO. : 5,734,336
DATED : March 31, 1998
INVENTOR(S) : Stuart B. Smithline

It is certified that error appears in the above-indentified patent and that said Letters Patent is hereby corrected as shown below:

ON THE TITLE PAGE:

In the abstract, Line 3, replace "a from end" with --a front end--.

Claim 1, Line 14, replace "track" with --truck--.
Claim 1, Line 54, replace "heard" with
Claim 1, Line 64, replace "heard" with
Claim 2, Line 43, replace "dryers" with --drivers--.
Claim 2, Line 58, replace "minor" with --mirror--.
Claim 3, Line 62, replace "dryer" with --driver--.
Claim 4, Line 34, replace "dose" with --close--.
Claim 5, Line 46, replace "fight" with --right--.

Claim 8, Line 25, replace "heard" with

Signed and Sealed this

Twenty-ninth Day of September, 1998

Attest:

BRUCE LEHMAN

Attesting Officer

Commissioner of Patents and Trademarks